April 17, 1956     S. LARACH     2,742,376
METHOD OF APPLYING LUMINESCENT COATINGS
Filed Aug. 24, 1953
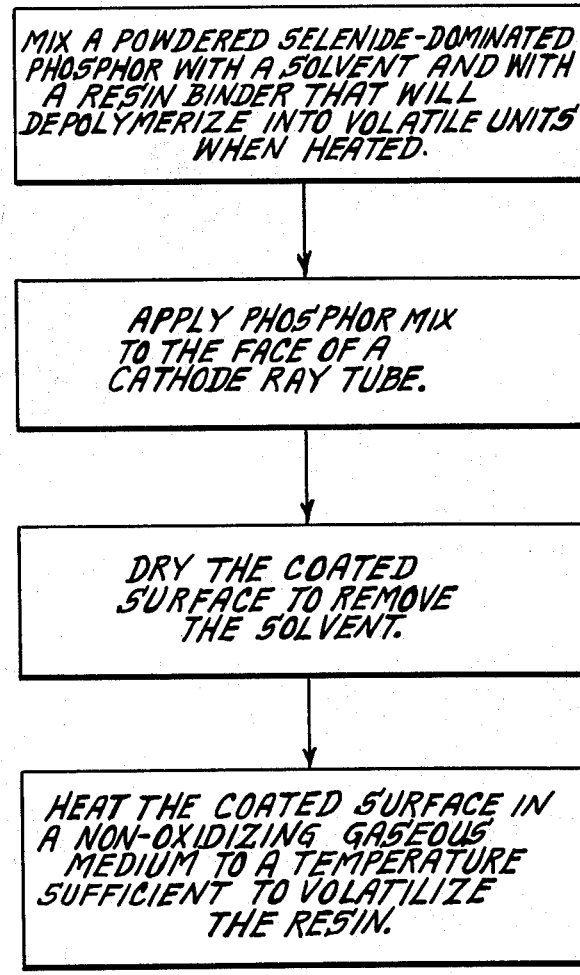
INVENTOR.
*Simon Larach*
BY *J. C. Whittaker*
ATTORNEY

United States Patent Office 2,742,376
Patented Apr. 17, 1956

2,742,376

METHOD OF APPLYING LUMINESCENT COATINGS

Simon Larach, New Brunswick, N. J., assignor to Radio Corporation of America, a corporation of Delaware Application August 24, 1953, Serial No. 376,200

11 Claims. (Cl. 117—33.5)

This invention relates generally to methods of applying a luminescent coating to a surface and more specifically to improved methods which are particularly advantageous for applying a selenide-type phosphor coating to the inner face of a cathode ray tube.

The luminescent screen on the face of an all-electronic tri-color kinescope comprises a plurality of precisely spaced dots of three different phosphors. When they are excited, each phosphor emits light of a different color. Usually, the tube is designed with a red-emitting phosphor, a green-emitting phosphor, and a blue-emitting phosphor.

The phosphors may be applied to the face of the tube in several ways. One method of applying these dots is by the silk screen process. By this method, a paste comprising a powdered phosphor, a binder for example ethyl cellulose, and a solvent for example iso amyl alcohol is screened on the face of the tube. The screen is dried to remove the solvent and the process is repeated for the second and for the third phosphor. When the three phosphors have been applied and the screen is dry, the tube is heated in air to a temperature sufficient to volatilize the binder.

This process is satisfactory for most phosphors, but produces a marked decrease in the luminescence emission of selenide-dominated phosphors which are among the most efficient red-emitting phosphors which are presently known. The luminescence efficiency of the selenide-dominated phosphors are affected in two ways: (1) commercial ethyl cellulose and other commercial resins contain impurities which apparently adversely react with the phosphor, and (2) when a selenide-dominated phosphor is baked in air, the phosphor reacts with oxygen to form other compounds. Since the efficient operation of a tri-color kinescope depends in part on the balanced emission from the three phosphors, any loss in luminescence emission is particularly undesirable. Therefore, it is desirable to provide a process for applying these phosphors to the tube face to minimize loss in luminescence efficiency in the fabrication process.

Previously the face of such a tube has been coated with a suspension comprising a powdered phosphor, a resin which depolymerizes into volatile units upon the application of heat, and a solvent. The coating is dried to remove the solvent and then heated in a vacuum to a temperature sufficient to depolymerize the resin. The products of depolymerization are removed by the vacuum exhaust system. Such a process produces satisfactory results, but entails the use of expensive vaccum equipment in the production line, and requires very careful control over the process to obtain a uniform product. Also when a phosphor begins to decompose, the vacuum accelerates the decomposition rate substantially.

It is an object of the invention to provide an improved method of applying luminescent coatings.

A further object of the invention is to provide an improved method of applying selenide-dominated phosphors to a support with minimum loss in luminescence efficiency.

Another object of the invention is to provide an improved method of applying selenide-dominated phosphors to cathode ray tubes.

The foregoing objects are accomplished in accordance with the instant invention by an improved method of coating a surface with a luminescent material which comprises: (1) applying to the surface to be coated a suspension comprising a powdered selenide-dominated luminescent material, a resin which will depolymerize into volatile units when heated to between about 100° and 500° C., and a volatile solvent; (2) drying the coated surface to remove the solvent and (3) heating the coated surface in a non-oxidizing gaseous medium to a temperature sufficient to volatilize the resin. The instant invention also includes electron tubes having luminescent coatings prepared by the said improved method.

Additional novel features and advantages of the invention are described in greater detail hereinafter and by reference to the accompanying drawing in which the single figure is a flow chart illustrating various steps in a general method of applying luminescent coatings to cathode ray tubes according to the present invention.

Referring to the drawing, a powdered phosphor is mixed with a solvent and a resin which will depolymerize into volatile units when heated. The mix may be prepared in the form of a paste or a slurry depending upon the method by which it is later applied. The mix is applied to the face of a cathode ray tube by any known method. The coated surface is dried to remove the solvent and then heated in a non-oxidizing gaseous medium to a temperature sufficient to volatilize the binder.

*Example*

A silk screen paste is prepared by combining 24 grams of powdered copper activated zinc selenide phosphor having the approximate composition ZnSe:Cu(0.01) with 3 grams of methyl methacrylate in sufficient methyl ethyl ketone to dissolve the methyl methacrylate and to obtain the desired viscosity. The viscosity of this mix is preferably about 20,000 centipoises. The phosphor paste is applied to the face of a cathode ray tube by the silk screening process. The applied paste is dried and then baked in an atmosphere of nitrogen at a temperature of about 325° C. for approximately 45 minutes. The resulting luminescent coating has approximately the same luminescence efficiency as the phosphor had before application to the tube face.

If the luminescence emission of the raw phosphor of the example is considered to be 100, then a coating prepared according to the method of this invention and (1) fired in air for 45 minutes at 325° C. has a luminescence emission of about 40; (2) fired in nitrogen for 45 minutes at 325° C. has a luminescence emission of about 100; and (3) fired in nitrogen for 180 minutes at 325° C. has a luminescence emission of about 75. It can be seen that a forty-five minute firing in nitrogen produces a luminescent coating that has about 2½ times the emission of a similar coating produced by firing in air. It can also be seen that firing the luminescent coating in air for about 45 minutes produces more than twice the deleterious effect on the luminescence emission of the coating as a 180 minute firing in nitrogen.

While the example specifies particular materials, other equivalent materials may be used. For example, any selenide-dominated phosphor may be used in place of the copper-activated zinc selenide phosphor of the example. The phosphor is preferably composed essentially of at least one element selected from the group consisting of cadmium and zinc, at least one element selected from the group consisting of sulphur and selenium, and an activator selected from the group consisting of silver, copper, and manganese. The activator quantities are preferably in the range of 0.001 to 0.05 weight per cent for copper and silver and 0.1 to 2.0% weight per cent for manganese. Luminescent screens may be fabricated to great advantage by the method of the instant invention with the following phosphors, for example: ZnSe:Cu(0.01), ZnSe(97):ZnS(3):Cu(0.01), 0.1 ZnS:0.9 ZnSe:Cu(0.01), 0.2 ZnS:0.8 ZnSe:Cu(0.01), ZnSe:Ag(0.005), Zn(S:Se): Ag(0.005), ZnSe (no activator), ZnSe:Mn (1.0), Zn(S:Se)Mn (1.0).

The resin is introduced into the mix to bind the phosphor to the surface during the preparation of the screen. Any resin may be used which will decompose into volatile units upon the application of heat within the bake-out temperatures of the tube manufacturing processes, for example, polystyrene, cycloparaffin resin, cyclopentadiene polymer and iso-butylene polymers all of which break down into monomers, dimers, trimers, etc., when heated to temperatures between about 100° and 500° C.

The solvent is introduced into the mix to dissolve the resin and to aid in obtaining uniform mixtures. The solvent is also used to adjust the viscosity of the phosphor mix so that even, uniform coatings may be obtained. Other solvents that may be used in place of methyl ethyl ketone are dibutyl phthalate and toluene.

The viscosity of the mix may be adjusted to suit the process used to apply the mix. For the silk screening process described, the viscosity may be varied between 5,000 and 100,000 centipoises. The preferred viscosity is approximately 20,000 centipoises. The phosphor mix may be applied to the tube face by any known method. The silk screening process has been found to be a good method of applying phosphor coatings to cathode ray tubes. Another method comprises pouring the mix on the surface to be coated, and then allowing the excess to drain away. Alternatively, the phosphor mix may be sprayed on the surface to be coated. While the example describes a method of applying phosphor coatings to cathode ray tubes, the same method may be used to produce an improved luminescent coating on any surface.

The heating step of the present invention is critical, as it is in prior methods. During the heating step the remaining solvent and all of the resin must be removed from the coating without carbonizing and without leaving any undesirable residue. In the case of selenide type phosphors this step must be carried out in the absence of oxidizing gases in order to prevent a decrease in the luminescence efficiency of the phosphor. For this purpose the firing may take place in any known non-oxidizing gaseous medium, for example, argon, neon or helium. The preferred gaseous medium is nitrogen. In accordance with the present invention, expensive vacuum equipment is eliminated, since the process may be carried out at atmospheric pressure. It is only necessary to provide a controlled non-reactive atmosphere which is readily and economically accomplished in a commercial process.

The firing temperature is determined by the depolymerization temperature of the resin. In ordinary cathode ray tube manufacture, the tube is baked out at between 350° and 500° C. to remove volatile materials in the tube, before sealing the envelope. The removal of the resin is most desirable during the bake-out period.

There has thus been described an improved method of applying luminescent coatings especially adapted for the application of selenide-dominated phosphors to cathode ray tube screens with minimum loss in luminescence efficiency.

What is claimed is:

1. A method of coating a surface with powdered luminescent material which comprises: (1) applying to the surface to be coated a suspension comprising a powdered luminescent material having a host crystal consisting essentially of at least one element selected from the group consisting of sulphur and selenium and at least one element selected from the group consisting of zinc and cadmium, a volatile solvent and a resin that will depolymerize into volatile units when heated to between about 100° and 500° C. and (2) heating the coated surface in a gaseous medium that is inert to said luminescent material to a temperature sufficient to depolymerize the resin.

2. A method according to claim 1 wherein the resin is methyl methacrylate and the solvent is methyl ethyl ketone.

3. A method according to claim 1 wherein the gaseous medium is nitrogen.

4. A method of coating a surface with a luminescent material which comprises: (1) applying to the surface to be coated a suspension comprising a powdered copper-activated zinc selenide phosphor, methyl methacrylate and methyl ethyl ketone, (2) drying the coated surface to remove the methyl ethyl ketone and (3) heating the coated surface in a gaseous medium that is inert to said phosphor to a temperature sufficient to depolymerize the methyl methacrylate.

5. The method according to claim 4 wherein said phosphor has about the composition ZnSe:Cu (0.01).

6. The method according to claim 4 wherein said phosphor has about the composition ZnSe(97):CdSe (3):Cu(0.01).

7. A method of coating a surface with powdered luminescent material which comprises: (1) applying to the surface to be coated a suspension comprising a powdered phosphor consisting essentially of at least one element selected from the group consisting of zinc and cadmium, at least one element selected from the group consisting of sulphur and selenium and activator quantities of an element selected from the group consisting of copper, silver and manganese; a solvent and a resin that will depolymerize into volatile units when heated to between about 100° and 500° C. and a solvent for said resin, (2) drying the coated surface to remove the solvent and (3) heating the coated surface in a gaseous medium that is inert to said phosphor to a temperature sufficient to depolymerize said resin.

8. A method of coating a surface with a luminescent material which comprises: (1) applying to the surface to be coated a suspension comprising a powdered phosphor selected from the class consisting of zinc selenide and zinc-cadmium selenides and activated with between about .001 and 0.05% by weight of copper and a solvent and a resin that will depolymerize into volatile units when heated to between about 100° and 500° C., (2) drying the coated surface to remove the solvent and (3) heating the coated surface in a gaseous medium that is inert to said phosphor to a temperature sufficient to depolymerize said resin.

9. A method of coating a surface with a luminescent material which comprises: (1) applying to the surface to be coated a suspension comprising a powdered copper-activated zinc selenide phosphor, methyl methacrylate and methyl ethyl ketone, (2) drying the coated surface to remove the methyl ethyl ketone and (3) heating the coated surface in an atmosphere of nitrogen at a temperature between about 300° and 450° C. for about 30 minutes.

10. A method according to claim 9 wherein said phosphor has about the composition ZnSe:Cu(0.01).

11. A method according to claim 9 wherein said phosphor has about the composition ZnSe (97):CdSe(3):Cu(0.01).

References Cited in the file of this patent

UNITED STATES PATENTS

| | | |
|---|---|---|
| 2,297,048 | Britten et al. | Sept. 29, 1942 |
| 2,312,229 | Anderson | Feb. 23, 1943 |
| 2,597,660 | McKeag et al. | May 20, 1952 |